(12) United States Patent
Yamada et al.

(10) Patent No.: US 8,579,058 B1
(45) Date of Patent: Nov. 12, 2013

(54) MOWER PROVIDED WITH LEAF BLOWER UNIT

(75) Inventors: Masahiro Yamada, Norcross, GA (US); Takeshi Komorida, Duluth, GA (US)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/528,021

(22) Filed: Jun. 20, 2012

(51) Int. Cl.
*B60K 17/28* (2006.01)

(52) U.S. Cl.
USPC .......................................... 180/53.8

(58) Field of Classification Search
USPC ............ 180/53.8, 54.1, 55, 900; 15/322, 347, 15/405
See application file for complete search history.

(56) References Cited

U.S. PATENT DOCUMENTS

| 4,118,826 | A |   | 10/1978 | Kaeser |   |
| 5,020,309 | A | * | 6/1991  | Hopkins | 56/13.3 |
| 5,090,088 | A |   | 2/1992  | Toth |   |
| 7,240,891 | B2 | * | 7/2007  | Hafendorfer | 248/676 |
| 8,387,205 | B2 | * | 3/2013  | Weihl et al. | 15/347 |
| 2008/0264029 | A1 | * | 10/2008 | Sepaniak | 56/202 |

FOREIGN PATENT DOCUMENTS

JP     08-294316    4/1995

* cited by examiner

*Primary Examiner* — Faye M. Fleming
(74) *Attorney, Agent, or Firm* — Greenblum & Bernstein, P.L.C.

(57) ABSTRACT

A ride-on mower including a frame unit supported to the ground through front wheels and rear wheels, a drive unit for supplying drive power to the front wheels and/or rear wheels, a mower unit, and a leaf blower unit. The ride-on mower is also provided with a blade drive power transmission mechanism for transmitting drive power to a blade of the mower unit, and a fan drive power transmission mechanism for transmitting rotational power from the blade drive power transmission mechanism to a fan. An adjustment mechanism is provided for adjusting the direction of an air discharge opening of the leaf blower unit. The leaf blower unit is arranged on a mower deck of the mower unit.

20 Claims, 8 Drawing Sheets

MOWER PROVIDED WITH LEAF BLOWER UNIT

TECHNICAL FIELD

The present invention relates to a ride-on mower provided with a mower unit including a rotary blade and a leaf blower unit.

BACKGROUND ART

A blower machine of a propelling type for blowing off fallen leaves while traveling is known from U.S. Pat. No. 4,118,826. In this type of blower machine, the position of the blower unit per se is changed to shift a blower opening to a higher level or lower level from the ground and vary the direction of air coming from the blower opening in a vertical (height) direction by adjusting a deflector provided in the blower opening.

In a leaf blower machine known from U.S. Pat. No. 5,090,088, a vehicle similar to a hand-operated lawn mower is provided with a shaft having a horizontal rotational axis driven by a motor in a side of a vehicle body, and a fan mounted on the horizontal rotary axis. This U.S. publication suggests that the leaf blower machine may also be used as a lawn maintenance machine.

Another ride-on lawn mower is disclosed in Japanese Unexamined Patent Application Publication No. 08-294316 which includes clippings drawing blower provided in a side portion of a mower unit, a bendable, flexible duct for directing the clippings drawn by the blower to a grass collector, and a cleaner nozzle attachable to an extreme end of the duct removed from the grass collector. When a cleaning operation is performed for removing dust and dirt accumulated in a deck of the mower unit, the extreme end of the duct is pull out from a lid of the grass collector and the cleaner nozzle is attached to the extreme end of the duct. Next, the operator holds the cleaner nozzle in their hands and directs air from the blower driven through a shaft transmission device from the mower unit to dust and dirty settled on a top surface of the mower unit. Although this Japanese publication discloses that air from the blower is used for cleaning the mower unit, no consideration is given to blow off fallen leaves accumulated on the road, for example, using air from the blower.

SUMMARY OF INVENTION

Recently, there has been a demand for a technique for using a ride-on mower including a mower unit having a rotary blade as a self-propelling leaf blower vehicle of a ride-on type with a simple and effective arrangement.

A ride-on mower according to a first aspect of the present invention comprises front wheels and rear wheels; a frame unit forming a vehicle body and supported to the ground by the front wheels and rear wheels; a drive unit mounted on the frame unit for supplying drive power to the front wheels and/or rear wheels; a mower unit mounted on the frame unit to be vertically movable and including; a blade drive power transmission mechanism; a leaf blower unit; and an adjustment mechanism. The mower unit includes at least one blade, and a mower deck covering the at least one of blade from above. The blade drive power transmission mechanism is adapted to transmit drive power to the at least one blade. The leaf blower unit includes a fan, a fan drive power transmission mechanism for transmitting rotational power from the blade drive power transmission mechanism to the fan, a shroud for covering the fan, and a duct connected to the shroud at one end thereof and having an air discharge opening formed at the other end thereof for discharging air produced by the fan. The adjustment mechanism is connected to the leaf blower unit for adjusting the direction of the air discharge opening. The adjustment mechanism includes a control member for transmitting operational movement provided by the operator seated in a driver's seat to the duct as movement for adjusting the direction of the air discharge opening.

With the above-described ride-on mower according to the first aspect, the fan drive power transmission mechanism receiving drive power from the blade drive power transmission mechanism for transmitting drive power to the mower unit is adapted to transmit rotational drive power to the fan of the leaf blower unit. This simplifies the fan drive power transmission mechanism. Further, the direction of the air discharge opening of the leaf blower unit can be adjusted by transmitting operational movement provided by the operator seated in the driver's seat to the duct. Thus, it is possible for the operator to control the leaf blower unit while being seated and driving the ride-on mower, thereby to clean fallen leaves, for example, by power of air.

A ride-on mower according to a second aspect of the present invention comprises front wheels and rear wheels; a frame unit forming a vehicle body and supported to the ground by the front wheels and rear wheels; a drive unit mounted on the frame unit for supplying drive power to the front wheels and/or rear wheels; a mower unit mounted on the frame unit to be vertically movable; a blade drive power transmission mechanism; and a leaf blower unit. The mower unit includes at least one blade, and a mower deck covering the at least one of blade from above. The blade drive power transmission mechanism is adapted to transmit drive power to the at least one blade. The leaf blower unit includes a fan, a fan drive power transmission mechanism for transmitting rotational power from the blade drive power transmission mechanism to the fan, a shroud for covering the fan, and a duct connected to the shroud at one end thereof and having an air discharge opening formed at the other end thereof for discharging air produced by the fan. Further, the mower deck has a projecting portion protruding to the side from the vehicle body, and the fan drive power transmission mechanism and the shroud are arranged above the projecting portion so as not to project outward from the mower deck as viewed from the top.

With the above-described ride-on mower according to the second aspect, the fan drive power transmission mechanism and the shroud representing primary components of the leaf blower unit are not protruded outward from the projecting portion defining the side end region of the mower deck. Thus, the mower deck functions as a safety frame to reduce the possibility that the fan drive power transmission mechanism and the shroud may collide with an obstacle present on the road. In addition, the bottom surfaces of the fan drive power transmission mechanism and the shroud are fully protected by the mower deck.

DESCRIPTION OF EMBODIMENTS

Figure 1:
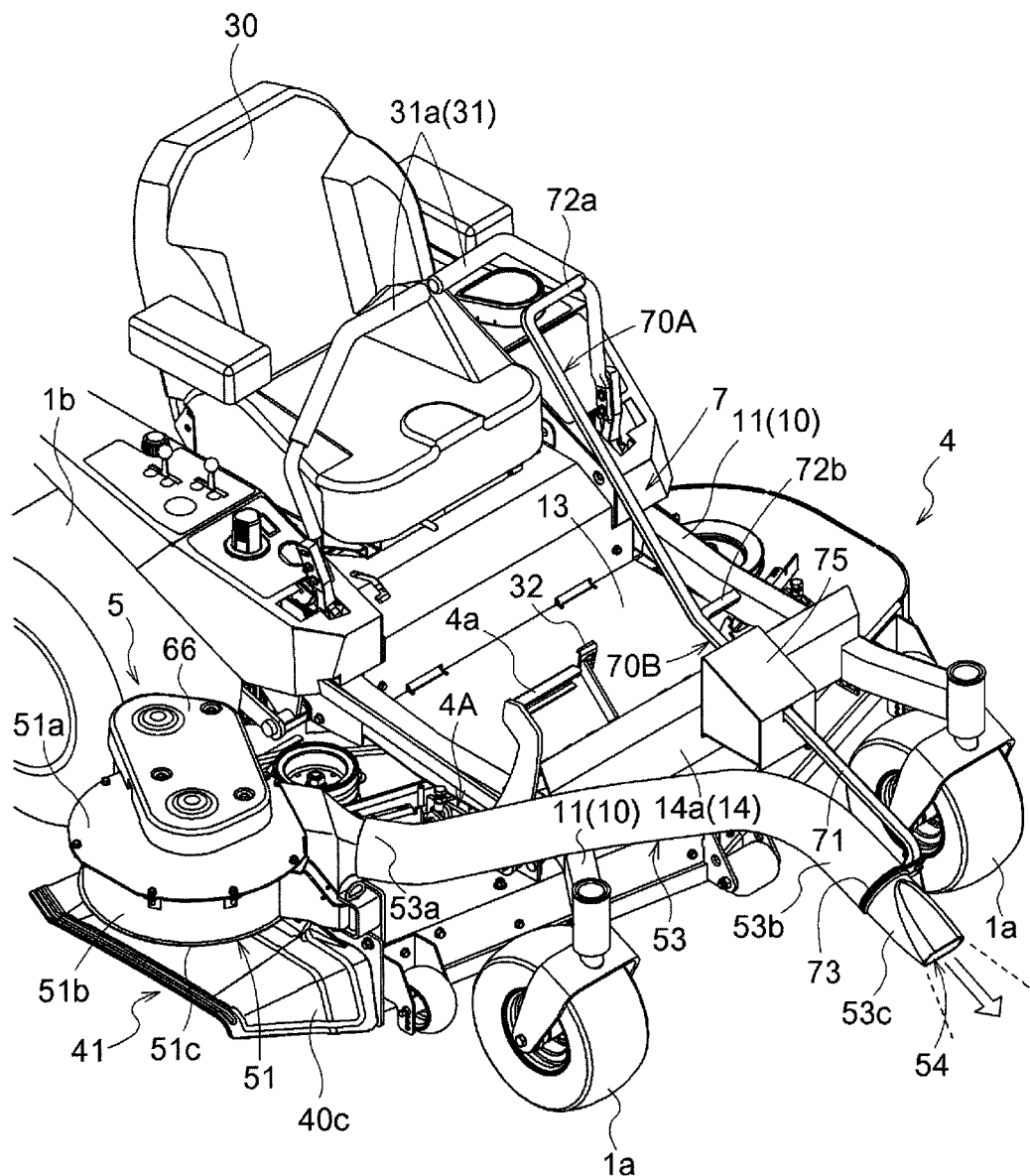
FIG. 1 is a perspective view showing a front half of a zero-radius-turning mower as an example of a ride-on mower according to the present invention.
Figure 2:
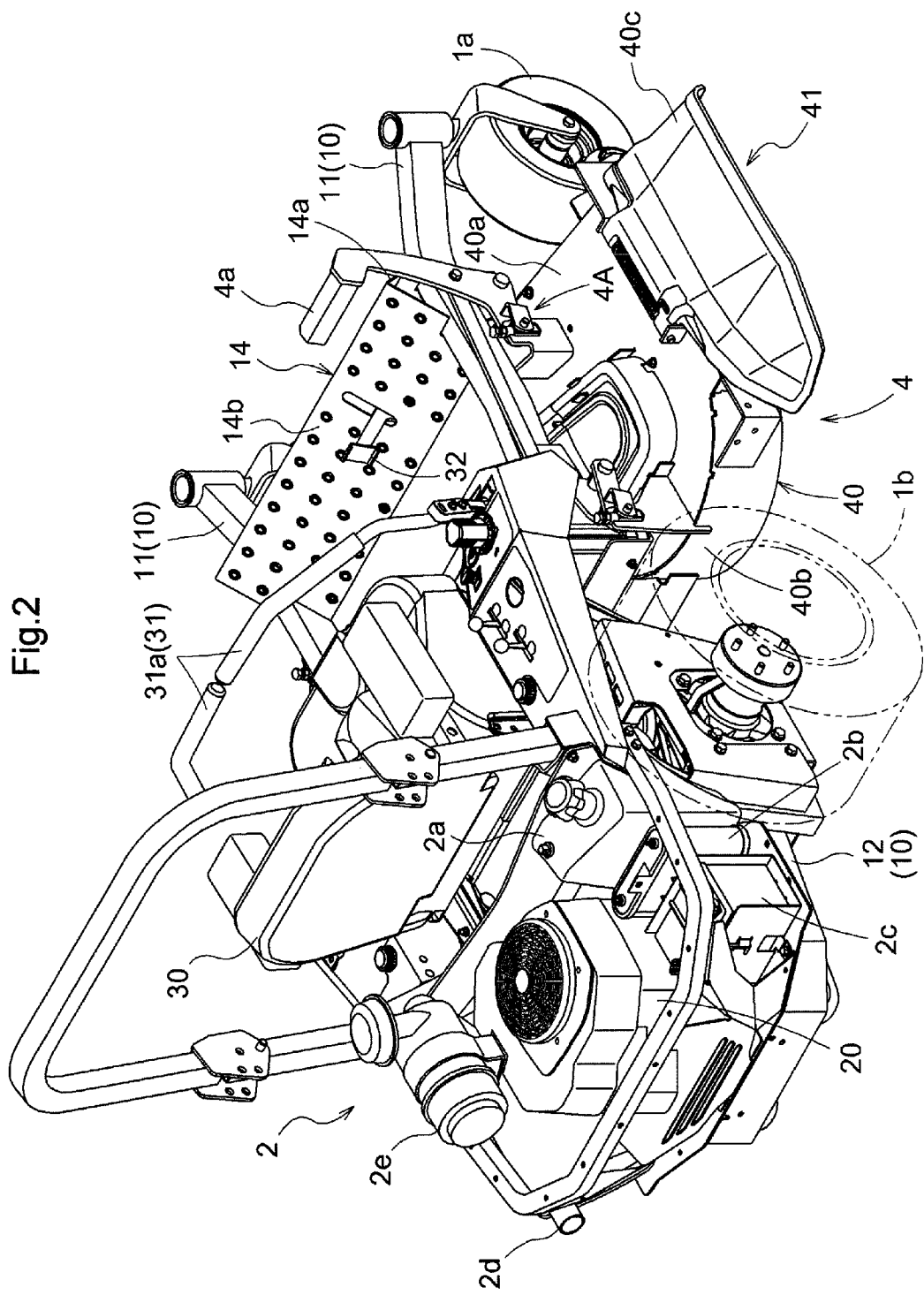
FIG. 2 is a perspective view of the zero-radius-turning mower without such a leaf blower unit seen diagonally from the rear and above.
Figure 3:
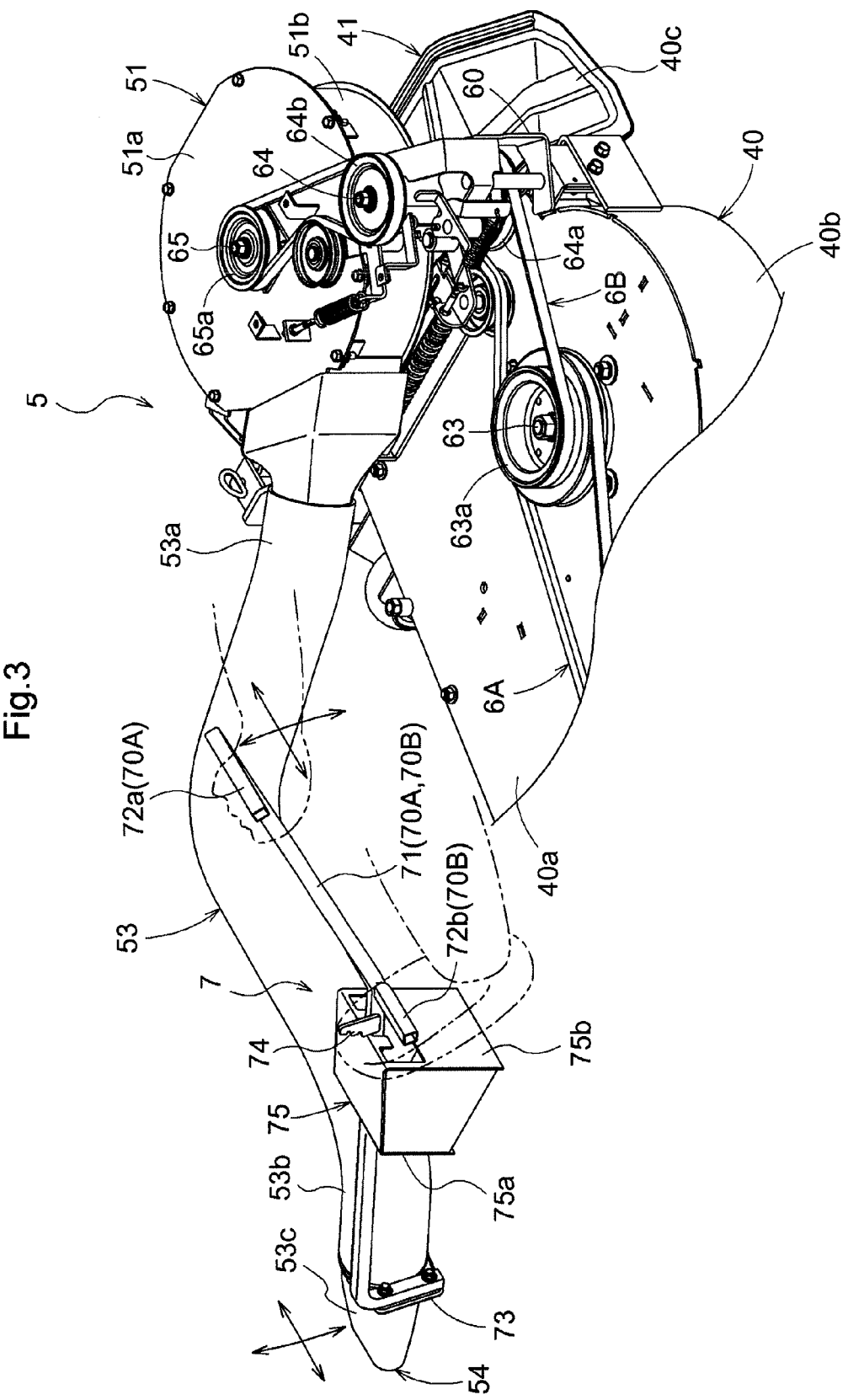
FIG. 3 is a perspective view of the leaf blower unit mounted above the mower unit seen diagonally from the rear.

FIG. 1 is a Perspective View Showing a Front Half Of a Zero-Radius-Turning Mower As an example of a ride-on mower according to the present invention. The zero-radius-turning mower includes a right and left pair of front wheels 1a, a right and left pair of rear wheels 1b, and a mower unit 4 mounted under a vehicle body between the front wheels and the rear wheels. In addition, a leaf blower unit 5 is mounted above the mower unit 4 for blowing off fallen leaves on the road, for example, by blown air. FIG. 2 is a perspective view of the zero-radius-turning mower without such a leaf blower unit 5 seen diagonally from the rear and above. FIG. 3 is a perspective view of the leaf blower unit 5 mounted above the mower unit 4 seen diagonally from the rear.

The vehicle body is formed by a frame unit 10 including a right and left pair of front frames 11 representing longitudinal frames made of square pipes, a right and left pair of rear frames 12 connected to the front frames, and cross beams connecting the front frames 11 to each other and the rear frames 12 to each other. The frame unit 10 is supported to the ground through the front wheels 1a each having a smaller diameter and formed as a caster wheel and the rear wheels 1b each having a larger diameter and formed as a drive wheel in the illustrated example. The mower unit 4 is supported to the frame unit 10 to be vertically movable through a raising/lowering mechanism 4A operated by an elevation control pedal 4a. The elevation control pedal 4a has an arm portion extending upright in the outside of the frame unit 10 and a step portion extending horizontally from the arm portion to the inner side of the vehicle body. In the current description, the term "front" means the forward side and the term "rear" means the rearward side in the traveling direction of the vehicle body unless any specific definition is given.

A floor 13 made of sheet metal is provided between the right and left front frames 11. Further, a front wall unit 14 is provided as a cross bar in a front end region of the floor 13 in a longitudinal direction of the vehicle body. The front wall unit 14 has a generally triangle vertical section, and includes a front plate 14a representing a front surface of the mower and a rear plate 14b facing away from the front plate 14a. The rear plate 14b produces a slanting surface extending toward a driver's seat 3 and acts as a footrest. A nonslip surface is provided in the rear plate 14b by bore-machining. In addition, a vertical slot is formed in a substantially central portion of the rear plate 14b, through which a parking/brake pedal 32 extends upward.

The mower unit 4 is a blade type having at least one blade (three blades in the illustrated example). Since the blades are covered by a mower deck 40, and thus not visible in FIGS. 1 to 3. The mower deck 40 includes a top wall 40a and a side wall 40b having a partially opened portion. As best understood from FIG. 4, a side cover 40c shaped as an extension of the opened portion and the surrounding top wall 40a and side wall 40b produces a clippings discharge opening 41 for discharging grass clippings to the side. The side cover 40c forms a projecting portion of the mower deck 40 protruding to the side to a great extent from the frame unit 10 in a transverse direction of the vehicle body.

As shown in FIG. 2, an engine 20 forming a drive unit 2 for supplying drive power to the rear wheels 1b acting as the drive wheels is provided rearwardly of the frame unit 10. The engine 20 is mounted with its output shaft projecting downward. A fuel tank 2a is mounted over a front side area to a right side area of the engine 20. The fuel tank 2a consists of a main tank portion arranged forwardly of the engine 20 under the driver's seat 30 and an auxiliary tank portion arranged rearwardly of the driver's seat 30 and extending upright in the right side of the engine 20. An oil-supply unit is attached to a top portion of the auxiliary tank portion of the fuel tank 2a. A canister 2b is arranged adjacent to the rear side of the auxiliary tank portion of the fuel tank 2a. A battery unit 2c is arranged adjacent to the rear side of the canister 2b. A muffler 2d is provided in the opposite side of the battery unit 2c across the engine 20, that is, in the left side of the engine 20. Further, an air cleaner 2e is provided in the left side of the engine 20 at a level higher than the engine 20.

Figure 5:
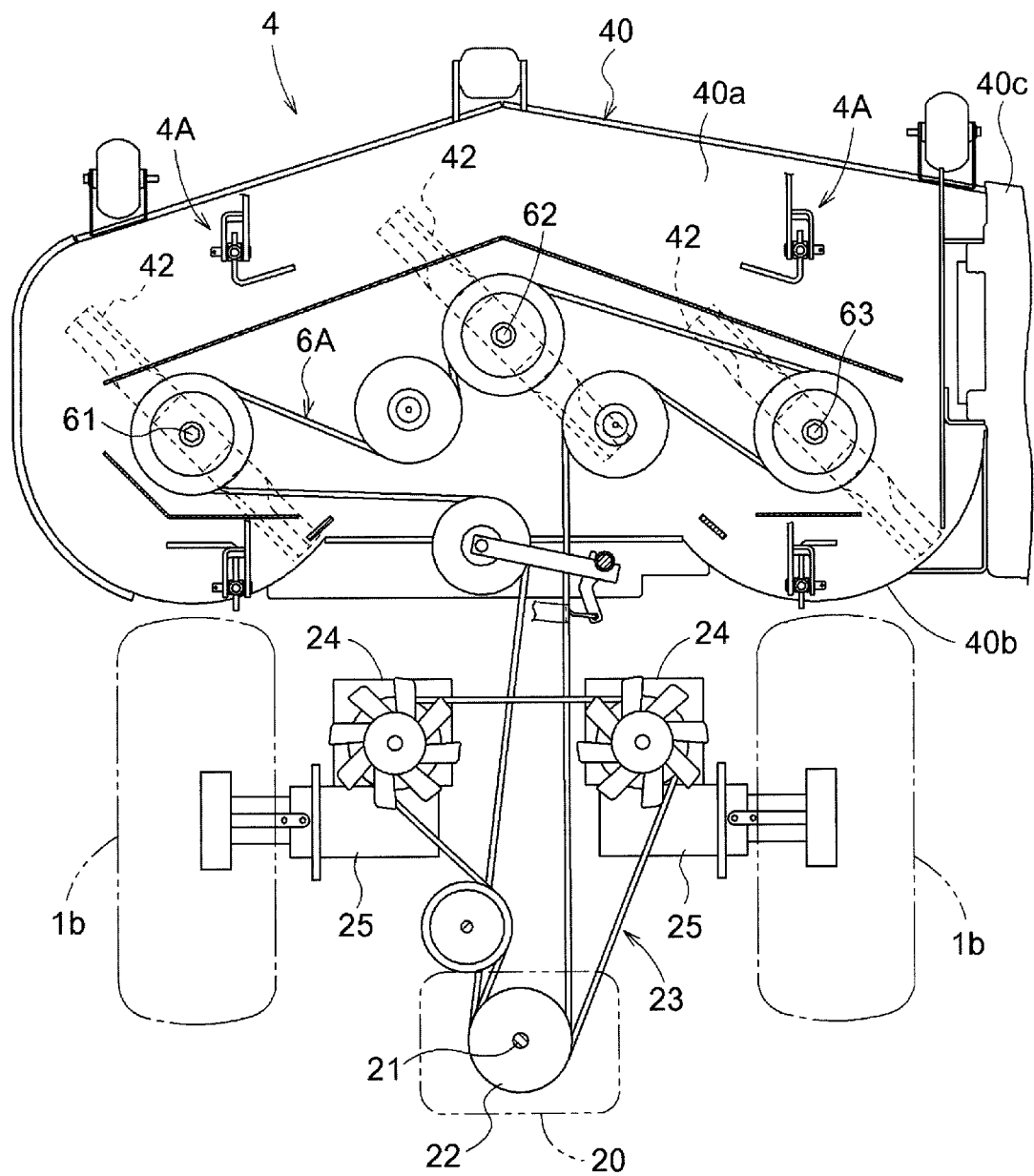
FIG. 5 is a schematic view showing a drive power transmission line in a wheel drive power transmission mechanism and a blade drive power transmission mechanism.

As shown in FIG. 5, an HST (hydrostatic transmission) 24 that is an example of a steplesss speed-change device for transmitting drive power to the rear wheels 1b and an axle transmission mechanism 25 are provided to correspond to each of the right and left rear wheels 1b. A belt pulley 22 is provided in each of the output shaft 21 of the engine 20 and each HST 24 to form a first belt transmission mechanism 23 acting as a wheel drive power transmission mechanism, in which rotational output of the engine 20 is transmitted to the HST 24. Each HST has a speed-change control shaft (not shown) that is linked to a right and left pair of shift control levers 31a forming a steering unit 31 provided forwardly of the driver's seat 30 through a control link mechanism so as to be controlled in response to oscillating operations of the shift control levers 31a in the longitudinal direction.

With the above-noted arrangement, the right and left shift control levers 31a are oscillated in the longitudinal direction to control the HST 24 corresponding to each of the shift control levers 31a for speed change, thereby to speed-change the right and left rear wheels 1b independently. More particularly, in this type of ride-on lawn mower, the right and left front wheels 1a are followably steered while the right and left rear wheels 1b are independently driven for speed change, thereby to desirably produce a stop state for stopping the right and left rear wheels 1b, a straight-forward traveling state for driving the right and left rear wheels 1b forwardly or reversely at the same speed, a gentle-turn state for driving the right and left wheels 1b forwardly or reversely at different speeds, a pivot-turn state for stopping one of the right and left rear wheels 1b while driving the other of them forwardly or reversely, and a spin-turn state for driving one of the right and left rear wheels 1b forwardly while driving the other of them reversely.

As depicted in broken line in FIG. 5, three cutting blades 42 are arranged side by side in the transverse direction of the vehicle body within the mower deck 41. The blades 42 are fixed to three blade shafts each having a vertical rotary axis supported to the mower deck 41, respectively, that is, a first blade shaft 61, second blade shaft 62 and third blade shaft 63. The first blade shaft 61, second blade shaft 62 and third blade shaft 63 extend upward through the top wall 40a. A second belt transmission mechanism 6A acting as a blade drive power transmission mechanism is provided between the output shaft 21 of the engine 20, first blade shaft 61, second blade shaft 62 and third blade shaft 63, and a belt pulley is mounted on each of the shafts. This allows the rotational output of the engine 20 to be transmitted to the mower unit 4 for rotating the blades 42. While not being visible in the drawings, the first belt transmission mechanism 23 for driving the wheels and the second belt transmission mechanism 6A for driving the blades use the output shaft 21 of the engine 20 as an input shaft, and arranged at different levels independently of each other planarly. More particularly, two belt pulleys 22 are fixed to the output shaft 21 of the engine 20.

Figure 4:
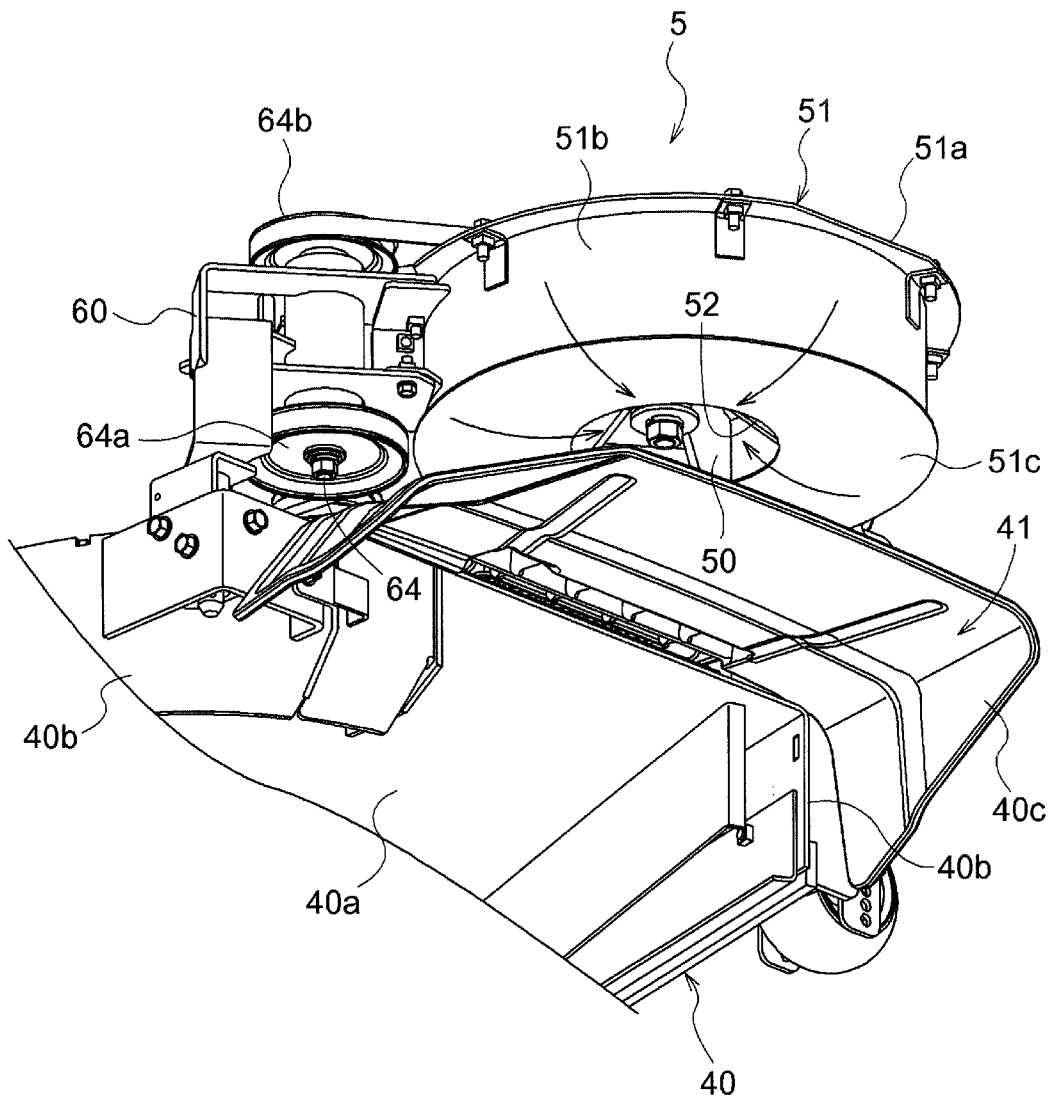
FIG. 4 is a perspective view of a clippings discharge opening, side cover and leaf blower unit seen from below.

The leaf blower unit 5 is a rotary fan type and provided with a fan 50 partially shown in FIG. 4, a shroud 51 for covering the fan 50, a duct 53, and a third belt transmission mechanism 6B acting as a fan drive power transmission mechanism for transmitting rotational power to the fan 50. The fan 50 is fixed to a fan shaft 65 formed as a vertical shaft having a vertical rotational axis. The duct 53 is connected to the shroud 51 at one end thereof and has an air discharge opening 54 formed at the other end thereof for discharging air produced by the fan 50.

The shroud 51 has a cylindrical shape and includes a top plate 51a, a side plate 51b and a bottom plate 51c. As understood from FIG. 4, the bottom plate 51c has an opened central portion acting as an intake 52 of the leaf blower unit 5. The fan shaft 65 extends upward through the top plate 51a. Since the fan 50 is a vertical rotational axis type, the height of the shroud 51 is limited. In the third belt transmission mechanism 6B, a group of pulleys are arranged horizontally. As a result, a space in the height direction for the shroud 51 and third belt transmission mechanism 6B is small, and the center of gravity is low to the ground. Thus, there is little possibility that the leaf blower unit 5 may destabilize the mower.

The third belt transmission mechanism 6B acting as the fan drive power transmission mechanism is mounted between the fan shaft 65 of the leaf blower unit 5 and the third blade shaft 63 of the mower unit 4 for transmitting the rotational drive power from the second belt transmission mechanism 6A acting as the blade drive power transmission mechanism to the fan shaft 65 to rotate the fan 50. Here, the third blade shaft 63 acts as a power diverging shaft. As shown in FIG. 3, the third belt transmission mechanism 6B has a diverging input shaft 64 in order to adjust a difference in height between the top wall 40a of the mower deck 40 and the top plate 51a of the shroud 51. To a lower end of the diverging input shaft 64 is fixed an input pulley 64a connected to a power diverging pulley 63a mounted in the third blade shaft 63 for belt transmission through a tightener pulley, and to an upper end of the diverging input shaft 64 is fixed an output pulley 64b. To an upper end of the fan shaft 65 is fixed a fan pulley 65a connected to the output pulley 64b for belt transmission through a tightener pulley. The diverging input shaft 64 and the shroud 51 are covered by a cover 66 from above.

As understood from FIGS. 1 and 3, the diverging input shaft 64 of the third belt transmission mechanism 6B and the shroud 51 are arranged so as not to project outward from the side cover 40c substantially forming the side projecting portion of the mower deck 40 and above the side cover 40c, that is, the mower deck 40, as viewed from the top. Here, as understood from FIG. 4, a gap is formed between the side cover 40c and the shroud 51, in which a top surface of the side cover 40c acts as a guide surface for an air flow to the intake 52. In other words, the intake 52 is isolated from the clippings discharge opening 41 through the side cover 40c.

Further, the third belt transmission mechanism 6B and the shroud 51 are supported to a support bracket unit 60 fixed to the mower deck 40. More particularly, since the mower deck 40 and the leaf blower unit 5 are formed integrally with each other, when the mower deck 40 is vertically moved through the raising/lowering mechanism 4A, the leaf blower unit 5 is also vertically moved with the mower deck 40, as a result of which the gap between the side cover 40c and the shroud 51 is not changed.

The duct 53 of the leaf blower unit 5 includes a duct proximal end portion 53a, a duct main body portion 53b and a duct distal end portion 53c. The duct proximal end portion 53a is connected to the side plate 51b of the shroud 51 to extend in a tangential direction of a rotational locus of the fan 50 and creates a flow passage for directing air from the fan 50 diagonally forward of the vehicle body in the tangential direction toward a transverse central portion of the vehicle body. The duct main body portion 53b is connected to the duct proximal end portion 53a at one end thereof. The duct main body portion 53b has a length to reach the transverse central portion of the vehicle body in the forward side of the mower unit 4. The duct distal end portion 53c is connected to the duct main body portion 53b and acts as a nozzle of the leaf blower unit 5. The duct distal end portion 53c has an opening functioning as the air discharge opening 54 of the leaf blower unit 5.

Either one or both of the duct proximal end portion 53a and the duct main body portion 53b have resilience to some extent to allow the duct distal end portion 53c to move in all directions. An adjustment mechanism 7 for adjusting a direction of the air discharge opening 54 by moving the duct distal end portion 53c will be described hereinafter.

In the current embodiment, the adjustment mechanism 7 is a control member 70 for transmitting operational movement provided by the operator seated in the driver's seat 3 to the duct 53 of the leaf blower unit 5 as movement for adjusting the level of the air discharge opening 54 from the ground and the position of the vehicle in the transverse direction. The control member 7 includes a manual control rod 70A for transmitting operational movement provided by the hand of the operator seated in the driver's seat 3 and a foot control rod 70B for transmitting operational movement provided by the foot of the operator seated in the driver's seat 3.

More particularly, the manual control rod 70A has a main rod 71 made of a bar member extending in the longitudinal direction of the vehicle, and a hand control portion 72a formed by bending a rear end portion of the main rod 71 substantially at a right angle. The foot control rod 70B has the main rod 71 and a foot control portion 72b formed by a bar member extending from an intermediate portion of the main rod 71 substantially at right angles. That is to say, those control rods share the main rod 71. The main rod 71 extends through a retainer box 75 described later and extends farther forwardly of the vehicle. A ring-shaped fixing bracket 73 is attached to an extreme end of the main rod 71. The duct distal end portion 53c of the duct 53 is fitted into a ring portion of the fixing bracket 73. With such an arrangement, the main rod 71 is moved vertically and horizontally by using the hand control portion 72a or foot control portion 72b, thereby to adjust the position of the duct distal end portion 53c, that is, the direction of the air discharge opening 54.

Figure 7:
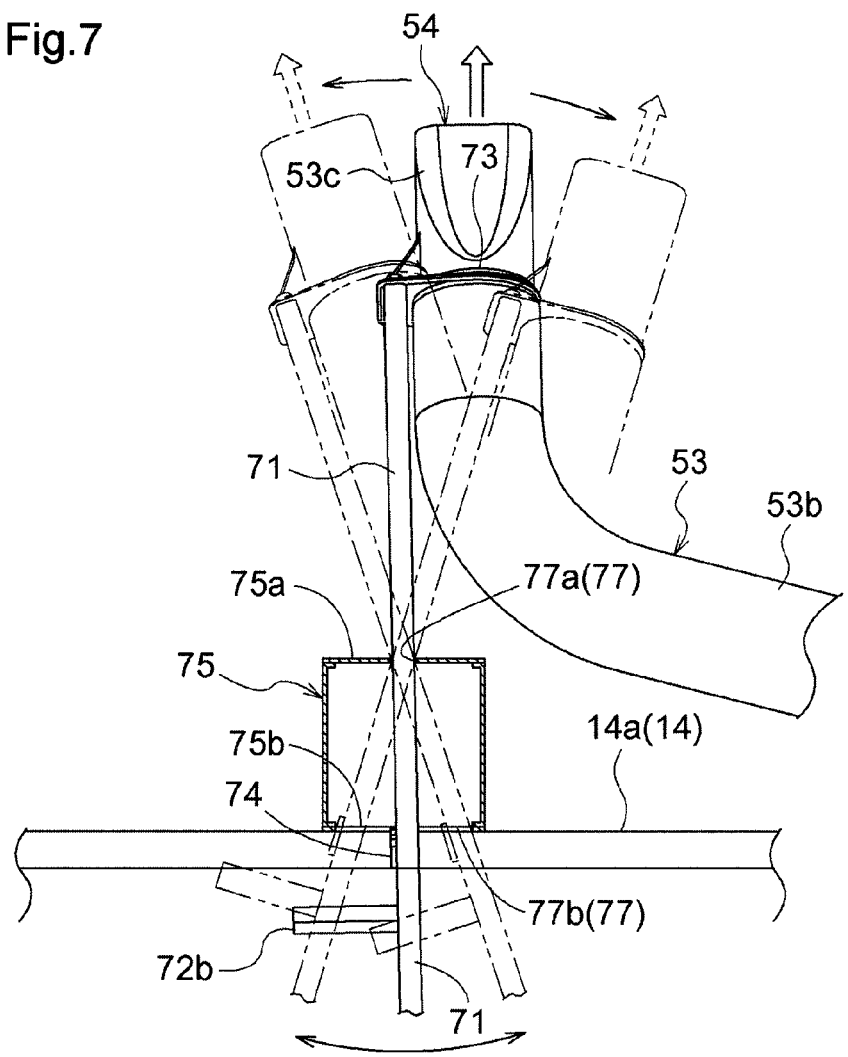
FIG. 7 is a top plan view showing the adjustment mechanism of the leaf blower unit.
Figure 8:
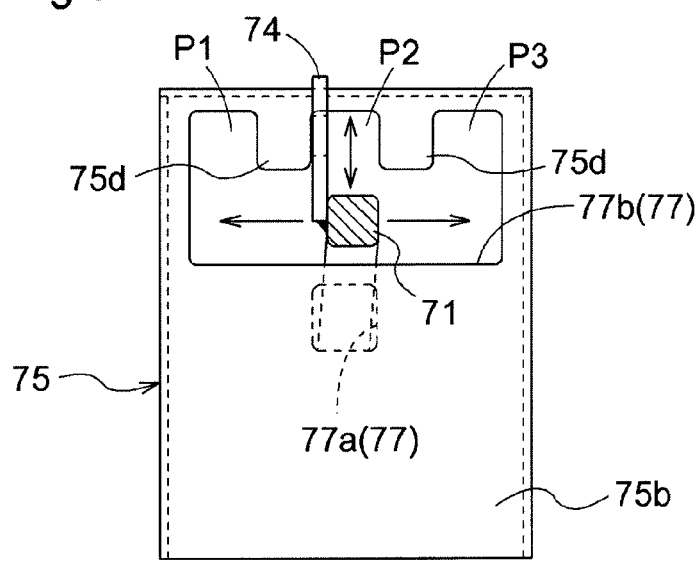
FIG. 8 is a rear view showing a relay box of the leaf blower unit.

The retainer box 75 has a function to retain the main rod 71 in a predetermined selected position. As understood from FIGS. 6 and 7, the retainer box 75 comes into contact with the front plate 14a of the front wall unit 14 and is fixed to the front frame 11. The retainer box 75 has a front plate 75a, a rear plate 75b and a top plate 75c. The retainer box 75 also has slots 77, through which the main rod 71 is allowed to extend. In the current embodiment, those slots 77 includes a front slot 77a formed in the front plate 75a and a rear slot 77b formed in the rear plate 75b as shown in FIG. 8. The front slot 77a is a square bore having an area slightly larger than a section of the main rod 71. On the contrary, the rear slot 77b is a slot having a large width and large height, in which three recess portions arranged in the transverse direction of the vehicle are created by two projecting pieces 75d protruding downward from an upper end of the rear plate 75b to form teeth of a comb, through which the main rod 71 is allowed to extend. The position of the extreme end of the main rod 71 in the transverse direction of the vehicle body is determined depending on which of the recess portions receives the main rod 71. Thus, the three recess portions act as positioning recess portions P1, P2 and P3 for adjusting the position of the air discharge opening 54 in the transverse direction of the vehicle body.

Figure 6:
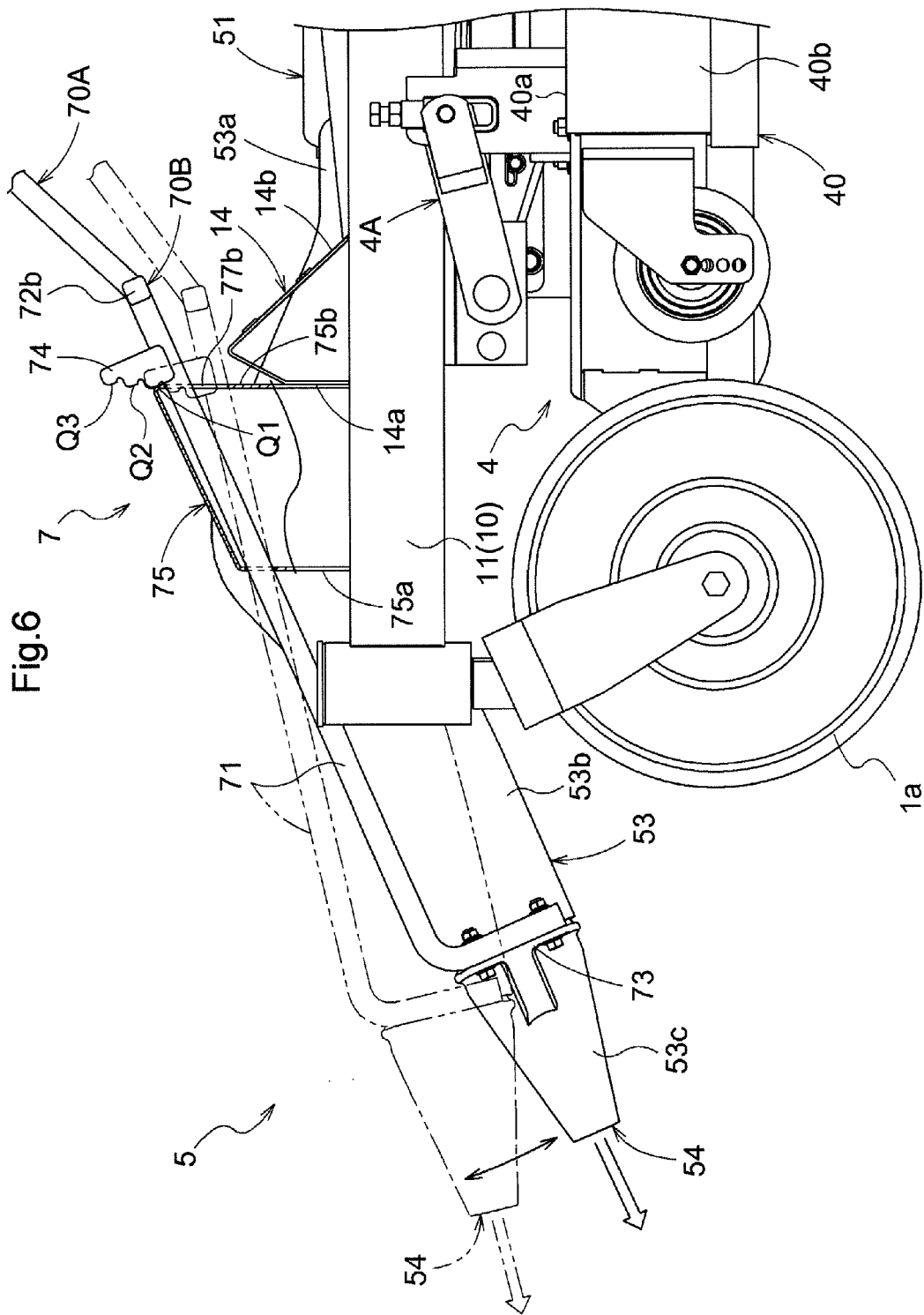
FIG. 6 is a side view showing an adjustment mechanism of the leaf blower unit.

As shown in FIG. 6, a plate-like engaging member 74 is fixed to a predetermined position of the main rod 71, that is, a position corresponding to the rear plate 75b of the retainer box 75. The engaging member 74 has a stepped front edge portion having three front edge sides. Those step-like three front edge sides come into contact with the upper edge of the rear plate 75b, thereby to determine the position of the extreme end of the main rod 71 in the vertical (height) direction of the vehicle body. Thus, the three front edge sides acts as positioning surfaces Q1, Q2 and Q3 for determining the position of the air discharge opening 54 in the vertical (height) direction of the vehicle body.

In order to adjust the position of the air discharge opening 54 with the adjustment mechanism 7 having the above structure, the operator seated in the driver's seat controls the main rod 71 using the hand control portion 72a or foot control portion 72b to allow the engaging member 74 to enter one of the three positioning recess portions P1, P2 and P3 of the retainer box 75 and allow one of the three positioning surfaces Q1, Q2 and Q3 of the engaging member 74 to come into contact with the upper end of the rear plate 75b. The air discharge opening 54 may be set in six directions (blowing directions) by combinations of the three positioning recess portions P1, P2 and P3 and the three positioning surfaces Q1, Q2 and Q3. The duct 53 is formed to have a resilient force to urge the main rod 71 to the forward direction of the vehicle body for allowing the engaging member 74 to be retained firmly in the retainer box 75. Although not shown, a spring may be provided to urge the main rod 71 to the forward direction of the vehicle body instead.

Other Embodiments

[1] In the above-described embodiment, the fan 50 of the leaf blower unit 5 is rotated about the vertical axis. Instead, it may be rotated about a horizontal axis.

[2] In the above-described embodiment, the adjustment mechanism 7 allows the air discharge opening 54 to be fixed in the six directions with the combinations of the three positions in the vertical direction of the vehicle body and the three positions in the transverse direction of the vehicle body. The air discharge opening 54 may be set in more positions with a similar arrangement. Further, the main rod 71 may be freely moved to determine the direction of the air discharge opening 54 freely. Still further, the adjustment mechanism 7 may have a multiarticular mechanism such as a robot arm, instead of the main rod 71.

[3] In the above-described embodiment, the fan drive power transmission mechanism 6B is adapted to receive drive power diverged from the blade drive power transmission mechanism 6A, as a result of which the blades 42 and the fan 50 are simultaneously rotated to clean fallen leaves by air blown from both of the clippings discharge opening 41 and the air discharge opening 54. Instead, a clutch may be provided in the fan drive power transmission mechanism 6B or the blade drive power transmission mechanism 6A (a tension pulley of the clutch type may be provided) to allow air to selectively blow from either one of or both of the clippings discharge opening 41 and the air discharge opening 54.

[4] In the above-described embodiment, the fan drive power transmission mechanism 6B is formed as the belt transmission mechanism. Instead, any other drive power transmission mechanism may be employed such as a gear transmission mechanism or a multiple transmission mechanism combined with a gear and a transmission shaft. Naturally, any drive power transmission mechanism other than the belt transmission mechanism may be used as the blade drive power transmission mechanism 6A or the wheel drive power transmission mechanism 23.

[5] In the above-described embodiment, the control member 70 includes both of the manual control rod 70A operable by the hand and the foot control rod 70B operable by the foot. Instead, either one of them will also suffice.

[6] In the above-described embodiment, the mower unit 4 is a side-discharge type having a clippings discharge opening 41 formed in the side of the mower deck 40. Meanwhile, the present invention is applicable to the lawn mower including the mower unit 4 of a mulching type dispensing with the clippings discharge opening 41 formed in the mower deck 40 for cutting and mulching grass clippings to let them fall within the mower deck 40. In addition, the present invention is also applicable to the lawn mower including the mower unit 4 of a rear discharge type for discharging grass clippings from the clippings discharge opening provided in a rear side of the mower deck 40.

Figure 9:
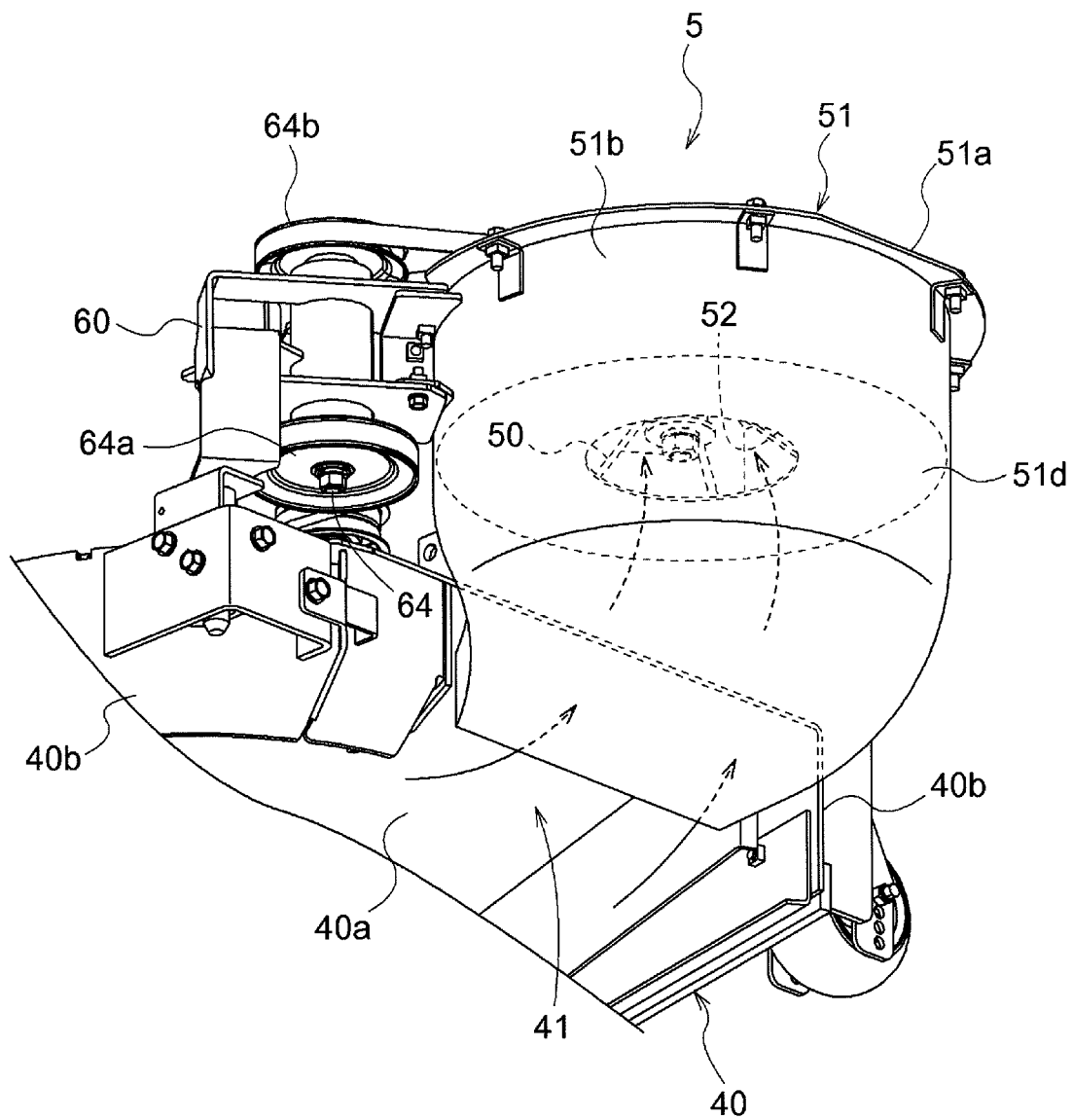
FIG. 9 is a perspective view of the clippings discharge opening and the leaf blower unit seen from below in a modified embodiment.

[7] In the above-described embodiment, the side cover 40c is present between the intake 52 of the shroud 51 and the clippings discharge opening 41, thereby to isolate the intake 52 from the clippings discharge opening 41. This allows the air flow to blow from the clippings discharge opening 41 on one hand, and allows the air flow to blow from the air discharge opening 54 of the duct 53 on the other hand. Instead, as shown in FIG. 9, part of the side plate 51b or bottom plate 51c of the shroud 51 is formed as a baffle 51d for guiding air blown from the clippings discharge opening 41 to the intake 52 of the shroud 51. This allows the air flow produced by the blades 42 to flow into the intake 52 of the shroud 51, as a result of which the air flow blown from the air discharge opening 54 becomes powerful.

[8] As a modification of the embodiment described in [7] above, the clippings discharge opening 41 may be directly connected to the intake 52 of the shroud 51 through the duct. In that case, it is possible to direct air blown from the clippings discharge opening 41 to the intake 52 more effectively.

What is claimed is:

1. A ride-on mower comprising:
   front wheels and rear wheels;
   a frame unit forming a vehicle body and supported above or on the ground by the front wheels and rear wheels;
   a drive unit mounted on the frame unit for supplying drive power to the front wheels and/or rear wheels;
   a mower unit mounted on the frame unit so as to be vertically movable and including
   at least one blade; and
   a mower deck covering the at least one blade from above;
   a blade drive power transmission mechanism for transmitting drive power to the at least one blade;
   a leaf blower unit including:

a fan;
a fan drive power transmission mechanism for transmitting rotational power from the blade drive power transmission mechanism to the fan;
a shroud for covering the fan; and
a duct connected to the shroud at one end thereof and having an air discharge opening formed at the other end thereof for discharging air produced by the fan; and
an adjustment mechanism connected to the leaf blower unit for adjusting the direction of the air discharge opening and including a control member for transmitting operational movement provided by the operator seated in a driver's seat to the duct as movement for adjusting the direction of the air discharge opening.

2. The ride-on mower defined in claim 1, wherein the control member is capable of adjusting the level of the air discharge opening from the ground and in a transverse direction in relation to the vehicle body.

3. The ride-on mower defined in claim 1, wherein the control member includes a manual control rod for transmitting operational movement provided by the hand of the operator seated in the driver's seat.

4. The ride-on mower defined in claim 1, wherein the control member includes a foot control rod for transmitting operational movement provided by the foot of the operator seated in the driver's seat.

5. The ride-on mower defined in claim 3, wherein the control member includes a foot control rod for transmitting operational movement provided by the foot of the operator seated in the driver's seat.

6. The ride-on mower defined in claim 1, wherein the mower deck has a projecting portion protruding to the side from the vehicle body, and the fan drive power transmission mechanism and the shroud are arranged above the projecting portion so as not to project outward from the mower deck as viewed from the top.

7. The ride-on mower defined in claim 6, wherein a clippings discharge opening is formed in a side end of the projecting portion of the mower deck, and the shroud has an intake isolated from the clippings discharge opening through the projecting portion.

8. The ride-on mower defined in claim 6, wherein the fan has a vertical rotational axis, and the duct extends in a tangential direction of a rotational locus of the fan from the fan toward a transverse central portion of the vehicle body forwardly of the vehicle body.

9. The ride-on mower defined in claim 1, wherein the blade drive power transmission mechanism is adapted to receive rotational power from the drive unit, while the fan drive power transmission mechanism is adapted to receive rotational power from the blade drive power transmission mechanism.

10. A ride-on mower comprising:
front wheels and rear wheels;
a frame unit forming a vehicle body and supported above or on the ground by the front wheels and rear wheels;
a drive unit mounted on the frame unit for supplying drive power to the front wheels and/or rear wheels;
a mower unit mounted on the frame unit so as to be vertically movable and including:
at least one blade; and
a mower deck covering the at least one blade from above;
a blade drive power transmission mechanism for transmitting drive power to the at least one blade; and
a leaf blower unit including
a fan;
a fan drive power transmission mechanism for transmitting rotational power from the blade drive power transmission mechanism to the fan;
a shroud for covering the fan; and
a duct connected to the shroud at one end thereof and having an air discharge opening formed at the other end thereof for discharging air produced by the fan;
wherein the mower deck has a projecting portion protruding to the side from the vehicle body, and the fan drive power transmission mechanism and the shroud are arranged above the projecting portion so as not to project outward from the mower deck as viewed from the top.

11. The ride-on mower defined in claim 10, wherein a clippings discharge opening is formed in a side end of the projecting portion of the mower deck, and the shroud has an intake isolated from the clippings discharge opening through the projecting portion.

12. The ride-on mower defined in claim 10, wherein the blade drive power transmission mechanism is adapted to receive rotational power from the drive unit, while the fan drive power transmission mechanism is adapted to receive rotational power from the blade drive power transmission mechanism.

13. A ride-on mower comprising:
front wheels and rear wheels;
a frame unit forming a vehicle body and supported above or on the ground by the front wheels and rear wheels;
a drive unit mounted on the frame unit for supplying drive power to the front wheels and/or rear wheels;
a mower unit mounted on the frame unit so as to be vertically movable and including
at least one blade; and
a mower deck covering the at least one blade from above and having a clippings discharge opening formed in a side thereof;
a blade drive power transmission mechanism for transmitting drive power to the at least one blade;
a leaf blower unit including
a fan;
a fan drive power transmission mechanism for transmitting rotational power from the blade drive power transmission mechanism to the fan;
a shroud for covering the fan and having an intake; and
a duct connected to the shroud at one end thereof and having an air discharge opening formed at the other end thereof for discharging air produced by the fan;
a baffle for guiding air blown from the clippings discharge opening to the intake of the shroud; and
an adjustment mechanism connected to the leaf blower unit for adjusting the direction of the air discharge opening.

14. The ride-on mower defined in claim 13, wherein the adjustment mechanism includes a control member for transmitting operational movement provided by the operator seated in a driver's seat to the duct as movement for adjusting the direction of the air discharge opening.

15. The ride-on mower defined in claim 1, wherein the shroud is supported by the mower deck so as to be vertically movable therewith.

16. The ride-on mower defined in claim 1, wherein the shroud is fixed to and above a portion of the mower deck so as to be vertically movable therewith.

17. The ride-on mower defined in claim 1, wherein the blade drive power transmission mechanism delivers drive power to the fan via the fan drive power transmission mechanism.

18. The ride-on mower defined in claim 1, wherein the drive unit is a source of drive power for multiple functions of the ride-on mower, wherein the multiple functions of the ride-on mower comprise each of:
- the front and/or rear wheels;
- the at least one blade of the mower unit; and
- the fan of the leaf blower unit.

19. The ride-on mower defined in claim 1, further comprising a power diverging shaft having a portion protruding above a top wall of the mower deck and being capable of transmitting power from the blade drive power transmission mechanism to the fan drive power transmission mechanism.

20. The ride-on mower defined in claim 1, further comprising a power diverging shaft mounted to the mower deck, and wherein the blade drive power transmission mechanism and the fan drive power transmission mechanism each comprises a belt that can rotate around an axis of the power diverging shaft.

\* \* \* \* \*